(No Model.) 2 Sheets—Sheet 1.
J. G. ALEXANDER.
HORSE HAY RAKE.
No. 376,175. Patented Jan. 10, 1888.
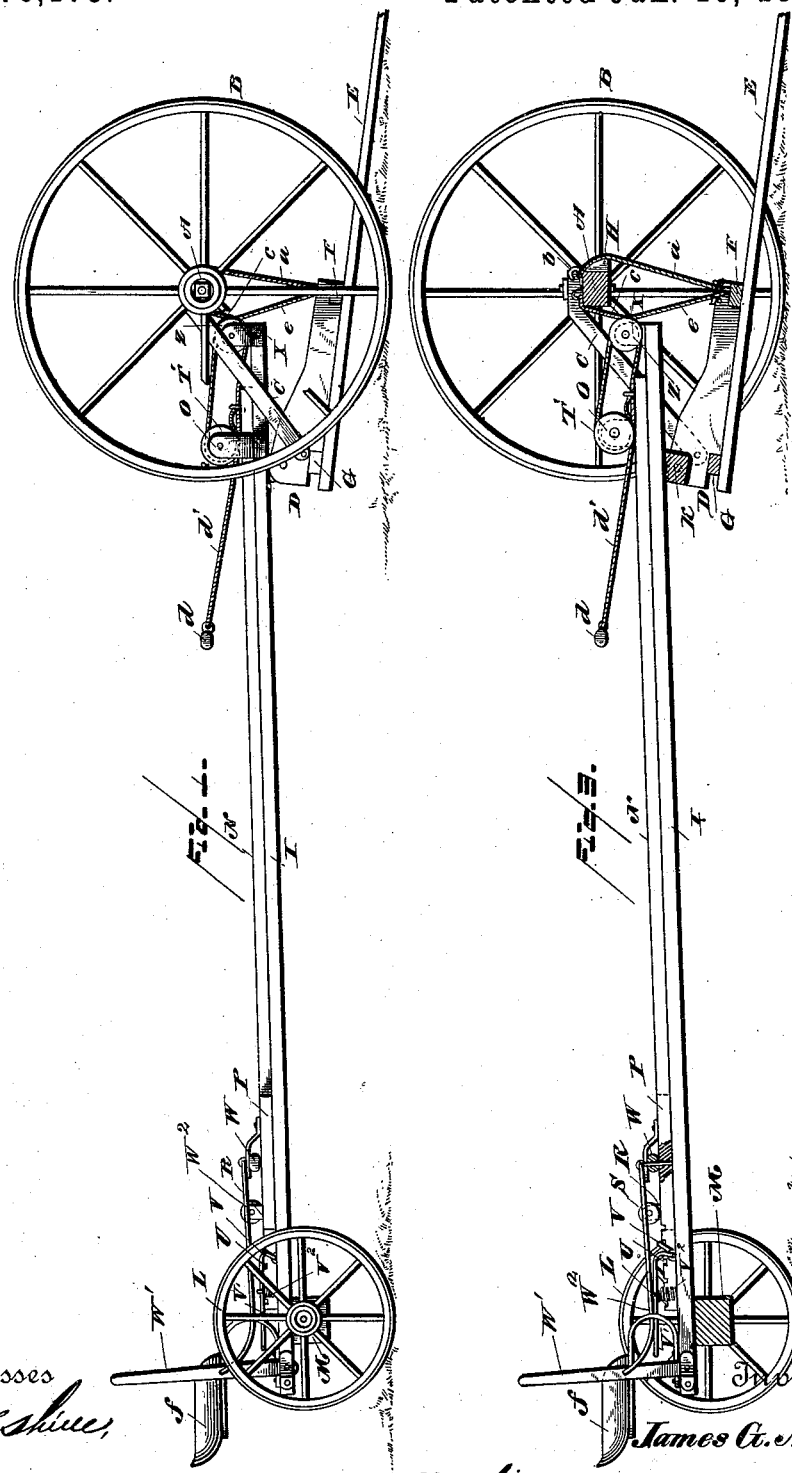

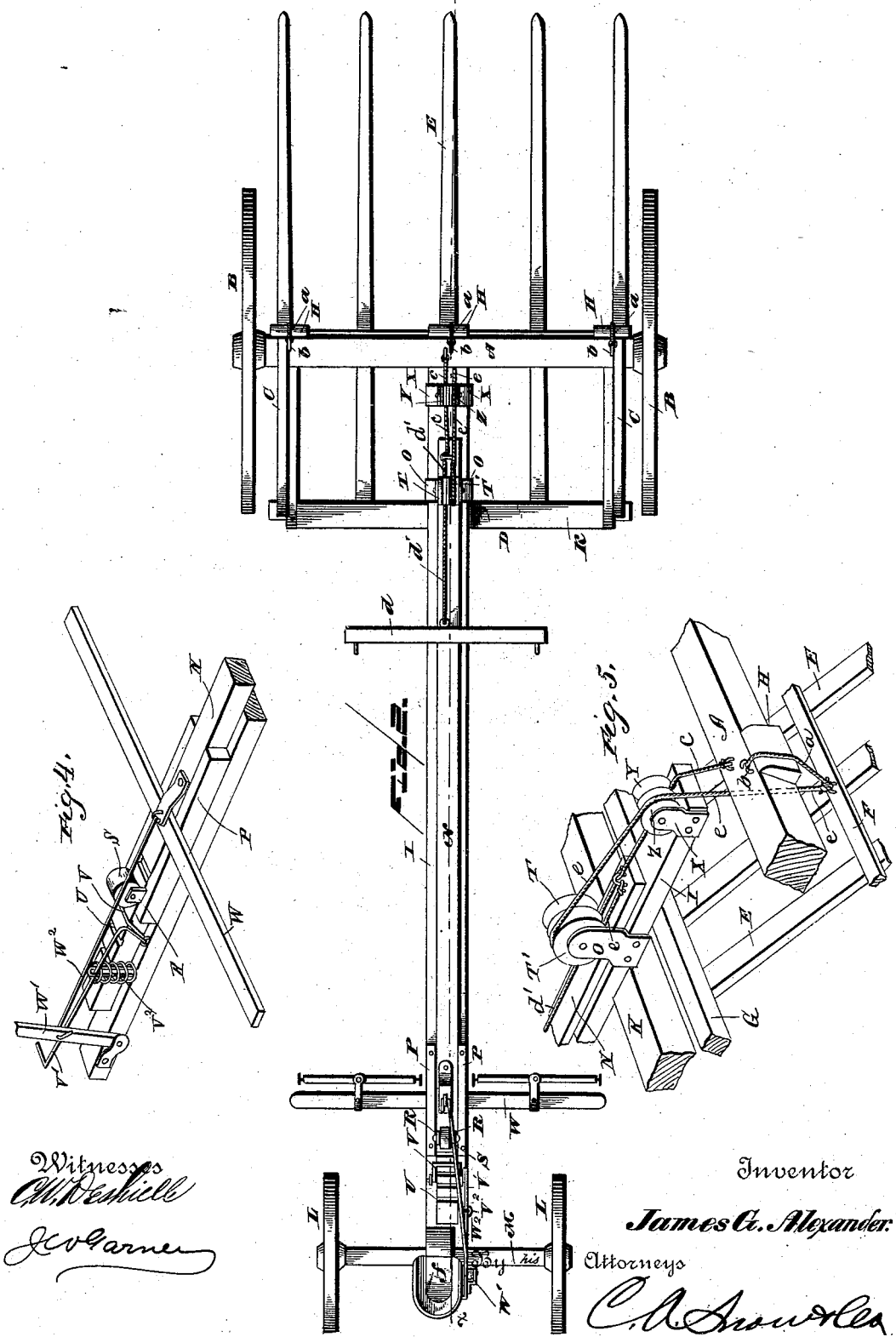

UNITED STATES PATENT OFFICE.

JAMES GREEN ALEXANDER, OF ILIA, MISSOURI.

HORSE HAY-RAKE.

SPECIFICATION forming part of Letters Patent No. 376,175, dated January 10, 1888.

Application filed November 8, 1886. Serial No. 218,303. (No model.)

*To all whom it may concern:*

Be it known that I, JAMES GREEN ALEXANDER, a citizen of the United States, residing at Ilia, in the county of Mercer and State of Missouri, have invented a new and useful Improvement in Horse Hay-Rakes, of which the following is a specification.

My invention relates to an improvement in horse hay-rakes; and it consists in the peculiar construction and combination of devices, that will be more fully set forth hereinafter, and particularly pointed out in the claims.

In the drawings, Figure 1 is a side elevation of a horse hay-rake embodying my improvements. Fig. 2 is a top plan view of the same. Fig. 3 is a vertical longitudinal sectional view taken on the line $x\ x$ of Fig. 2. Fig. 4 is an enlarged detail view showing the detent or dog to engage the sliding rod. Fig. 5 is an enlarged perspective view showing the rope connections between the rake-head, axle, and pushing-pole.

A represents the front axle, which is provided with the supporting-wheels B. From the rear sides of the axle extend a series of downwardly-projecting arms, C, to the rear ends of which is pivoted the rear end of the rake-head D. The latter may be of any suitable preferred construction, and is provided with rake-teeth E and cross-bars F and G, the latter being located at the rear ends of the teeth, and the cross-bar F being arranged transversely on the teeth and located below the axle A. On the front side of the axle, at the center and at each end thereof, is an arm or block, H, the front side of which is rounded, and thereby the said arm or block forms a segment.

I represents a pushing-pole, which is provided near its front end with a cross-bar, K. To the ends of the said cross-bar the rear end of the rake-head is pivoted. The rear end of the pushing-pole is supported by wheels L, that are mounted upon an axle, M. On the upper side of the pushing-pole is secured an endwise-moving rod, N, which is guided between brackets O near the front end of the pushing-pole and projecting parallel flanges P near the rear end of the pushing-pole. Brackets R project from the upper side of the said flanges near their rear ends, and between the said brackets is journaled a bearing-roller, S.

T and T' represent bearing-rollers, which are journaled between the brackets O, and are provided with peripheral grooves. The said rollers S and T T' bear upon the upper side of the rod N and retain the latter in position upon the upper side of the pushing-pole. On the upper side of the rod N, near its rear end, are a series of notches or serrations, U.

V represents a dog or detent which is pivoted to the pushing-pole near its rear end, and is adapted to engage the notches in the rod N. A lever, V', extends rearwardly from the dog or detent, and a spring, $V^2$, bears under the said lever, the function of the said spring being to cause the dog or detent to normally engage one of the notches in the rod N, and thus lock the latter fast to the pushing-pole.

W represents a whiffletree which is pivoted to the rod N near the rear end thereof, and W' represents a hand-lever which is pivoted to the rear end of the pushing-pole at one side thereof, and is connected to the bolt on which the whiffletree is pivoted by means of a link, $W^2$.

It will be readily understood that by first bearing upon the lever V' so as to cause the detent to disengage the rod N the latter may be moved forward or back by means of the lever W'.

The front end of the pushing-pole is provided on its upper side with vertical brackets X, between which are journaled grooved pulleys Y and Z. Three connecting ropes or chains, *a a a*, are attached to the cross-bar F of the rake-head, pass over the inclined side of the arms or projections H on the axle A, and are attached to the hooks *b* on the upper side of the said axle. A chain, *c*, is also attached to the upper side of the axle, passes under the pulley Y, and is connected to the front end of the rod N. A neck-yoke, *d*, is attached to the rear end of a rope or chain, *d'*, that passes forward under the pulley T, and is made fast to the front end of rod N.

*e* represents a rope or chain which is attached to the front end of rod N, from which it passes back under the pulley T', journaled between the brackets O, and over the pulley Z, and has its outer end attached to the cross-bar F of the rake-head.

The operation of my invention is as follows: The draft-animals are hooked to the whiffletree in the usual manner, and their collars are connected to the neck-yoke. The driver sits upon a seat, f, which is supported above the pushing-pole, and directs the team. When it is desired to lower the points of the teeth to the ground in position for raking, the driver places one foot upon the lever V' and disengages the dog or detent from the rod N, and he then pulls rearwardly upon the hand-lever, thus forcing the rod N rearwardly. It will be observed that the front end of the pushing-pole is supported by the chain c, and thus when the rod N is moved rearwardly so as to draw upon the chain c the front end of the pushing-pole will be elevated. The cross-bar K, attached to the under side of the pushing-pole, necessarily rises with the latter, and as the rear end of the rake-head is hinged to the said cross-bar and the rear ends of the arms C are pivoted to the rear end of the rake-head, it follows that the rear end of the rake-head will be raised, and also the rear ends of the arms C, causing the latter to partly rotate the axle. As the axle turns it slackens the chains a from the arms or projections H and lowers the points of the rake-teeth to the ground. As soon as a sufficient quantity of hay has been gathered upon the rake-head the detent is again disengaged from the rod N, and the latter is moved forwardly upon the pushing-pole by the horses attached to the whiffle-trees W, thus lowering the rear end of the rake-head, and consequently causing the arms C to lower, and thereby cause the axle to turn so as to raise the arms or projections H and tighten the chains or ropes a, and thus cause the latter to elevate the points of the rake-teeth until the rake-head assumes a horizontal position above the ground, when the rake-head, with its load of hay, may be directed to any direction and the hay conveyed to the stack.

No claim is made herein to the combination of the axle having the arms C extending to the rear, the rake-head having its rear end pivoted to the said arms, and the pushing-pole pivoted to the rear end of the rake-head, as the same is claimed in Letters Patent of the United States granted to me and to my assignee, W. E. Bracewell, February 22, 1887, No. 358,102. In the said patent I show a rock-shaft journaled on the axle having arms on its front side connected by chains or cords to the rake-head, and arms projecting from the rear side of the rock-shaft and connected by chains or cords to the pushing-pole and endwise-moving rod. In the present case I dispense entirely with the rock-shaft and connect the cords from the pushing-pole to the axle direct.

Having thus described my invention, I claim—

1. The combination of the axle having the arms C extending to the rear, the rake-head having its rear portion pivoted to the arms C, the push-pole having its front end pivoted to the rear end of the rake-head, the cords or chains connecting the axle with the rake-head, the movable rod attached to the push-pole and having the lever to operate it, and the chain or cord connecting the said rod with the axle, for the purpose set forth, substantially as described.

2. The combination of the supporting-axle having the arms C extending to the rear, the rake-head pivoted to the rear ends of the arms C, the cords or chains connecting the axle with the forward part of the rake-head, the push-pole having its front end pivoted to the rear end of the rake-head, the movable rod on the push-pole, the lever to move the said rod, the cord or chain connecting the axle with the rod, and the neck-yoke, also attached to the said rod, for the purpose set forth, substantially as described.

3. The combination of the supporting-axle having the arms C extending to the rear, the rake-head pivoted to the rear ends of the arms C, the chains a, connecting the axle with the rake-head, the push-pole having its front end pivoted to the rear end of the rake-head and provided with the pulleys Y and Z at its front end, and the pulleys T and T' at a suitable distance in rear thereof, the movable rod N on the push-pole, the chain c, connecting the axle and the rod N and passing under the pulley Y, the chain e, attached to the rake-head, passed over the pulleys Z and T', and attached to the front end of the rod N, and the chain d', attached to the front end of the rod N, passed under the pulley T, and having the neck-yoke attached to its free end, substantially as described.

4. In a horse hay-rake, the rake-head, in combination with the axle elevated above the rake-head, chains or cords connecting the axle to the rake-head, the pushing-pole I, pivoted to the rake-head in rear of the axle, cords or chains connecting the pushing-pole with the axle, and operating connections to work the cords mounted on the pushing-pole, as set forth.

5. In a horse hay-rake, the combination of the rake-head, the pushing-pole, the sliding rod on the pushing-pole, the whiffletree connected to the sliding rod, a hand-lever, and connections to work the rod, and thereby move the whiffletree, as set forth.

6. In a horse hay-rake, the combination of the rake-head, the pushing-pole, the sliding rod thereon, the whiffletree connected to the sliding rod, lever-connections to work the rod, and thereby move the whiffletree, cord or chain connections between the rod and the rake, the neck-yoke, and the cord or chain connecting the neck-yoke to the sliding rod, as set forth.

In testimony that I claim the foregoing as my own I have hereto affixed my signature in presence of two witnesses.

JAMES GREEN ALEXANDER.

Witnesses:
J. L. SHIPLEY,
J. E. TAYLOR.